May 27, 1952  J. R. CASSELL  2,598,352
APPARATUS FOR DESTROYING GROUND MOLES
Filed Feb. 18, 1948
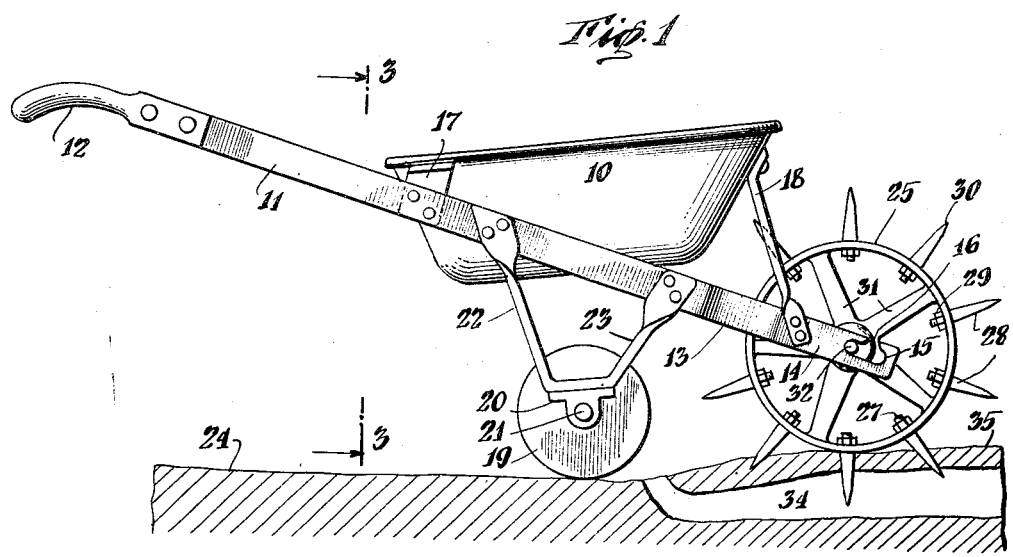
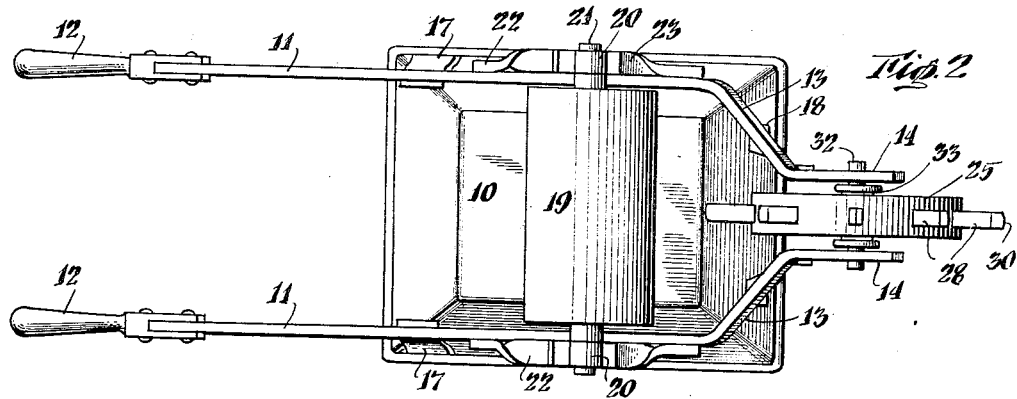
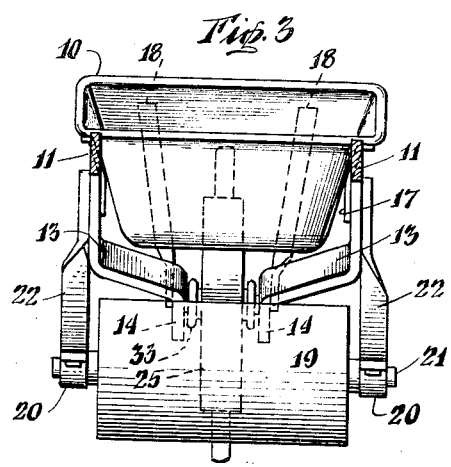
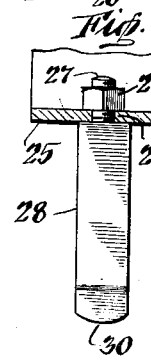
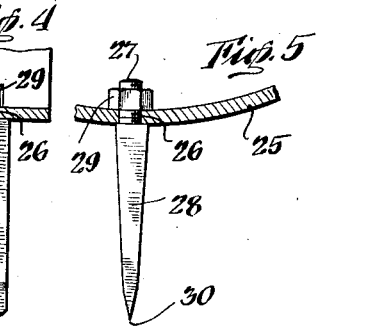
INVENTOR.
John R. Cassell
BY
Townsend & Decker
ATTORNEYS.

Patented May 27, 1952

2,598,352

UNITED STATES PATENT OFFICE 2,598,352

APPARATUS FOR DESTROYING GROUND MOLES

John R. Cassell, New York, N. Y.

Application February 18, 1948, Serial No. 9,282

2 Claims. (Cl. 43—124)

As is well known, certain types of rodents, such as ground moles and the like, burrow in the earth adjacent the surface thereof to enable them to feed on the roots of grass or other growing vegetation. Elongated tunnels are formed by such burrowing and the earth and its lawn are thrown up simultaneously with the burrowing operation to form ridges or "mole-hills" rising above the normal surface of the ground. These mole-hills not only produce an unsightly appearance in cases of well tended lawns, but in some instances they are actually detrimental as in the case, for instance, of putting greens on golf courses wherein the ridges or hills, obviously, would interfere with the proper playing of the game of golf.

The principal object of the invention is the production of an apparatus of simple construction by means of which a mole or the like may be expeditiously destroyed in the earth tunnel produced by the mole without the necessity of unduly tearing up the ground and lawn to uncover the mole and whereby the ridge or mole-hill forming the upper wall of the tunnel may be flattened in a simultaneous operation by pressing the deformed soil or earth downwardly into the tunnel to bury the destroyed mole and to level off the ridge or mole-hill whereby it and its lawn will lie substantially in the same plane as the adjacent ground and lawn.

To the above ends the invention consists in the novel apparatus and method for destroying ground moles hereinafter more particularly described and then specified in the claims.

In the accompanying drawing illustrating a practical embodiment of the invention:

Fig. 1 is a side elevation of the apparatus of the invention.

Fig. 2 is a bottom plan view thereof.

Fig. 3 is a vertical section on the line 3—3 of Fig. 1.

Fig. 4 is an enlarged front elevation of one of cutting members of the rodent-destroyer wheel and, Fig. 5 is an enlarged end view of the member of Fig. 4.

Referring in detail to the several figures of the drawing:

A barrow comprising a walled enclosure open only at the top thereof is indicated at 10. Said barrow, as customarily, is adapted to contain articles of various characters for the purpose of transporting them from one location to another. Elongated shafts 11 are positioned at either side of said barrow and terminate rearwardly thereof in guiding handles 12. The forward ends of said shafts are bent or inclined inwardly, as at 13, and then forwardly to provide parallel extensions 14. Said extensions are slotted as at 15, each of said slots being provided with an opening 16 in the upper wall thereof. The barrow 10 may be rigidly secured to the shafts 11 by the rear strut members 17 and the forward strut members 18 which are fastened to the extensions 14 of the shafts in any desirable manner although suitable detachable connections between said barrow and shafts may be employed, if so desired, such as those, for instance, between said shafts and a rodent-destroying device to be presently described.

A hollow, metallic roller is indicated at 19 and is provided with bearing members 20 within which a roller shaft 21 is journalled. Said bearing members are connected by strut members 22 and 23 to the shafts 11 to permit said shafts carrying the barrow 10 to oscillate or swivel on the roller shaft 21 as a pivot. To increase the pressure of the roller 19 on the ground and lawn which are indicated at 24, said barrow may be conveniently loaded with heavy objects such as rocks, concrete blocks and the like.

A mole or other rodent-destroying device is detachably mounted forwardly of the apparatus just described and comprises a wheel 25 provided with a plurality of openings 26 extending through the felly thereof and preferably equidistantly spaced apart and each receiving the screw-threaded shank or extension 27 of an outwardly extending cutting member 28 detachably held to the felly of the wheel by nuts 29 threaded over the shanks 27 and clamped against the inner side of the felly. The opposite faces or sides of said cutting members 28, adjacent their lower ends, are inclined or tapered and terminate at their intersection in a very sharp, somewhat curved, chisel-like edge 30. When so desired, said cutting members may be easily removed from the wheel 25 for sharpening their chisel-like edges 30 by the simple expedient of removing the nuts 29 in an obvious manner. The particular configuration of the lower ends of said cutting members 28 enables them to readily bite into and pierce the earth when said wheel 25 is rotated.

The wheel 25 is provided with spoke members 31 connected in any manner to the felly of the wheel and to a central hub thereof through which a shaft 32 extends. For detachably connecting the wheel to the forward extensions 14 of the shafts 11, the ends of the shaft 32 are slipped into the openings 16 of the slots 15 whereby rotation of the wheel will cause the shaft 32 to ride in either end of the slots 15 depending on the direction of such rotation. The walls of said slots 15, accordingly, act as bearings for the shaft 32. Collars 33 may be provided and are fastened to the shaft 32 to prevent endwise movement of said shaft in its bearings.

The ground 24 and lawn are shown as being provided with a tunnel 34 positioned slightly below the ground surface and which has been excavated by a mole as is the custom of these rodents. In the presence of excavation a ridge or mole-hill 35 is formed directly over the tunnel 34 and extending in a plane above the normal surface of the ground. These ridges or mole-hills may extend for considerable distances in a lawn and are not only extremely unsightly but are actually detrimental in some cases as hereinbefore explained. They may be eliminated and the mole or moles destroyed by means of the present apparatus by grasping the handles 12 and propelling the apparatus forwardly to traverse the mole-hill 35 longitudinally thereof. The lower ends of the cutting members 28 will then bite into and pierce the mole-hill 35 and extend into the tunnel 34 to destroy a mole or moles located therein. The roller 19 will thereupon condition the earth and lawn of the mole-hill by exerting downward pressure thereagainst. This pressure not only fills in the openings and smooths out the earth and lawn deformed by the cutting members 28 but it presses the earth downwardly into the tunnel and flattens or levels it off whereby it will lie in the same general plane as the adjacent earth and lawn. At the same time this operation covers and buries the dead mole in its own habitat.

The connections between the shafts 11 and the shaft or axle 32 of the mole-destroyer wheel 25 enables said wheel to be quickly disconnected from the remaining portion of the apparatus when so desired and to be hung on a nail or hook out of reach of children who might be injured by the sharp chisel-like edges 30 of the cutting members 28. When said wheel is so detached, the barrow 10 and roller 19 may be used for conventional purposes. Obviously, also, instead of rigidly fastening the barrow 10 to the shafts 11, any form of detachable connection may be employed between these parts as hereinbefore explained to permit of the ready removal of the barrow from the remaining apparatus and enable use of the roller, either by itself, or in conjunction with the rodent-destroying device.

The barrow 10 normally lies in a substantially horizontal position but it is shown as inclined rearwardly in Fig. 1 for the reason that the roller 19 engages the flat ground while the rodent-destroyer wheel 25 engages the mole-hill 35.

The invention claimed is:

1. An apparatus for destroying a ground mole located in a tunnel beneath the surface of the ground and beneath a ridge rising above said surface and over said tunnel comprising a wheel, a shaft supporting said wheel, a single row of straight and spaced flat blades fastened to and extending outwardly from the felley of the wheel in substantial alignment and terminating in sharpened transversely curved chisel-like edges, a roller positioned rearwardly of said wheel and having a width appreciably greater than that of said wheel and a pair of spaced propelling shafts extending rearwardly of the apparatus and connected to said roller, said propelling shafts being bent inwardly adjacent their forward ends and terminating in spaced and parallel extensions carrying said wheel shaft.

2. An apparatus for destroying a ground mole located in a tunnel beneath the surface of the ground and beneath a ridge rising above said surface and over said tunnel comprising a wheel, a plurality of straight and spaced mole-destroying flat blades fastened to and extending outwardly from the felley of the wheel and terminating in sharpened edges, a roller positioned rearwardly of said wheel and having a width appreciably greater than that of said wheel, a barrow positioned above said roller and a pair of spaced propelling shafts extending longitudinally of the apparatus and rearwardly thereof and connected to said roller and said barrow and being provided with slots adjacent their forward ends receiving said wheel shaft, said slots each having an opening in its upper wall communicating with the slot and of a size to permit the removal of said wheel shaft from said slots.

JOHN R. CASSELL.

REFERENCES CITED

The following references are of record in the file of this patent:

UNITED STATES PATENTS

| Number | Name | Date |
| --- | --- | --- |
| 137,764 | Denby | Apr. 15, 1873 |
| 166,721 | Richardson | Aug. 17, 1875 |
| 562,397 | Harlow | June 23, 1896 |
| 616,817 | Baker | Dec. 27, 1898 |
| 1,574,627 | Haines | Feb. 23, 1926 |
| 1,982,358 | Smith | Nov. 27, 1934 |
| 2,245,956 | Baily | June 17, 1941 |

FOREIGN PATENTS

| Number | Country | Date |
| --- | --- | --- |
| 189,311 | Great Britain | of 1922 |